United States Patent
Singleton

(10) Patent No.: US 10,408,254 B2
(45) Date of Patent: Sep. 10, 2019

(54) MOTION TRANSMITTING AND METHOD OF ASSEMBLING A REMOTE CONTROL ASSEMBLY HAVING A GUIDE MECHANISM

(71) Applicant: Kongsberg Driveline Systems I, Inc., Novi, MI (US)

(72) Inventor: Steve Singleton, Commerce, MI (US)

(73) Assignee: KONGSBERG DRIVELINE SYSTEMS I, INC., Novi, MI (US)

(*) Notice: Subject to any disclaimer, the term of this patent is extended or adjusted under 35 U.S.C. 154(b) by 392 days.

(21) Appl. No.: 15/037,834

(22) PCT Filed: Nov. 19, 2013

(86) PCT No.: PCT/US2013/070761
§ 371 (c)(1),
(2) Date: May 19, 2016

(87) PCT Pub. No.: WO2015/076783
PCT Pub. Date: May 28, 2015

(65) Prior Publication Data
US 2016/0290385 A1 Oct. 6, 2016

(51) Int. Cl.
*F16C 1/10* (2006.01)
(52) U.S. Cl.
CPC .......... *F16C 1/101* (2013.01); *F16C 2326/01* (2013.01)
(58) Field of Classification Search
CPC ....... F16C 1/101; F16C 1/106; F16C 2326/01
See application file for complete search history.

(56) References Cited

U.S. PATENT DOCUMENTS

| 2,148,867 A | * | 2/1939 | Lesage | F16C 1/101 74/502.5 |
| 4,093,241 A | | 6/1978 | Muntjanoff et al. | |

(Continued)

FOREIGN PATENT DOCUMENTS

| DE | 722661 | * | 7/1942 | F16C 1/101 |
| DE | 100 02 215 C1 | | 10/2001 | |

(Continued)

OTHER PUBLICATIONS

English Abstract of FR 2805585 A1, Ferron et al., Aug. 31, 2001. (Year: 2001).*

(Continued)

*Primary Examiner* — Vinh Luong
(74) *Attorney, Agent, or Firm* — Howard & Howard Attorneys PLLC

(57) ABSTRACT

A motion transmitting remote control assembly (100) comprises a first conduit section having a first end fitting (114) extending along a first longitudinal axis, and a second conduit section having a second end fitting (120) extending along a second longitudinal axis. The second end fitting has an open position where the second axis is transverse to the first axis, and a closed position where a portion of the first and second axes align. A first core element has a first coupler (128) mounted thereto, and a second core element has a second coupler (140) mounted thereto. A guide mechanism (144) having a first portion coupled to the first end fitting and a second portion coupled to the second end fitting, aligns the end fittings when the second end fitting is in the open position. The guide mechanism also guides the second end fitting toward the first end fitting until the second end fitting is in the closed position.

23 Claims, 7 Drawing Sheets

(56) References Cited

U.S. PATENT DOCUMENTS

| | | | |
|---|---|---|---|
| 4,218,935 A * | 8/1980 | Ion | F16C 1/10 74/502.4 |
| 4,452,097 A | 6/1984 | Sunkel et al. | |
| 4,456,101 A | 6/1984 | Yamamoto et al. | |
| 4,635,498 A | 1/1987 | Zimmermann et al. | |
| 4,669,330 A | 6/1987 | Stocker | |
| 4,682,513 A | 7/1987 | Reeder | |
| 4,838,110 A | 6/1989 | Koukal et al. | |
| 4,847,973 A | 7/1989 | Lundeen | |
| 4,854,185 A | 8/1989 | Lichtenberg et al. | |
| 5,377,556 A | 1/1995 | Byrnes | |
| 5,509,750 A | 4/1996 | Boike | |
| 5,575,180 A | 11/1996 | Simon | |
| 5,577,415 A | 11/1996 | Reasoner | |
| 5,632,182 A | 5/1997 | Reasoner | |
| 5,664,462 A | 9/1997 | Reasoner | |
| 5,910,194 A | 6/1999 | Cho | |
| 5,953,963 A | 9/1999 | Wirsing et al. | |
| 6,056,020 A | 5/2000 | Malone | |
| 6,092,436 A | 7/2000 | Wirsing | |
| 6,102,609 A * | 8/2000 | Tsuge | F16C 1/101 403/301 |
| 6,484,605 B1 | 11/2002 | Murg | |
| 6,571,658 B2 | 6/2003 | Koontz et al. | |
| 6,662,910 B2 * | 12/2003 | Grundke | B60T 7/045 188/204 R |
| 6,715,378 B1 | 4/2004 | Nakao | |
| 7,225,702 B2 | 6/2007 | Fannon et al. | |
| 8,312,788 B2 | 11/2012 | Kwon | |
| 8,814,460 B2 * | 8/2014 | Ingvast | F16C 1/101 403/301 |
| 8,960,047 B2 * | 2/2015 | Pradier | F16C 1/106 74/502.6 |
| 10,234,060 B1 * | 3/2019 | Ficyk | F16L 3/18 |
| 2004/0136779 A1 | 7/2004 | Bhaskar | |
| 2005/0160866 A1 | 7/2005 | Dona-Contero | |
| 2006/0048598 A1 | 3/2006 | Roussel et al. | |
| 2011/0226084 A1 | 9/2011 | Chiou | |
| 2011/0265596 A1 * | 11/2011 | Ferron | B62D 33/073 74/473.15 |
| 2013/0145584 A1 | 6/2013 | Ingvast et al. | |
| 2018/0229749 A1 * | 8/2018 | Zheng | B62B 3/02 |

FOREIGN PATENT DOCUMENTS

| | | | | |
|---|---|---|---|---|
| DE | 102007052771 A1 * | 5/2009 | | F16C 1/101 |
| FR | 2 632 707 A1 | 12/1989 | | |
| FR | 2805585 A1 * | 8/2001 | | F16C 1/101 |
| GB | 1 506 962 A | 4/1978 | | |
| JP | 2008-82448 A * | 4/2008 | | F16C 1/101 |
| WO | WO 97 29290 A1 | 8/1997 | | |

OTHER PUBLICATIONS

English Abstract of DE 102007052771 A1, Digel et al., May 7, 2009 (Year: 2009).*

English Abstract of JP 2008-82448 A, Iwano et al., Apr. 10, 2008. (Year: 2008).*

EPO Machine Translation of DE 102007052771 (A1), Digel et al., Jul. 5, 2009. (Year: 2009).*

English language abstract and computer-generated English language translation for FR 2 632 707 extracted from espacenet.com database on Jun. 29, 2016, 9 pages.

International Search Report for PCT Application No. PCT/US2013/070761 dated Jul. 16, 2014; 4 pages.

English language abstract and machine-assisted English language translation of DE 100 02 215 C1 extracted from www.espacenet.com on May 19, 2016; 6 pages.

* cited by examiner

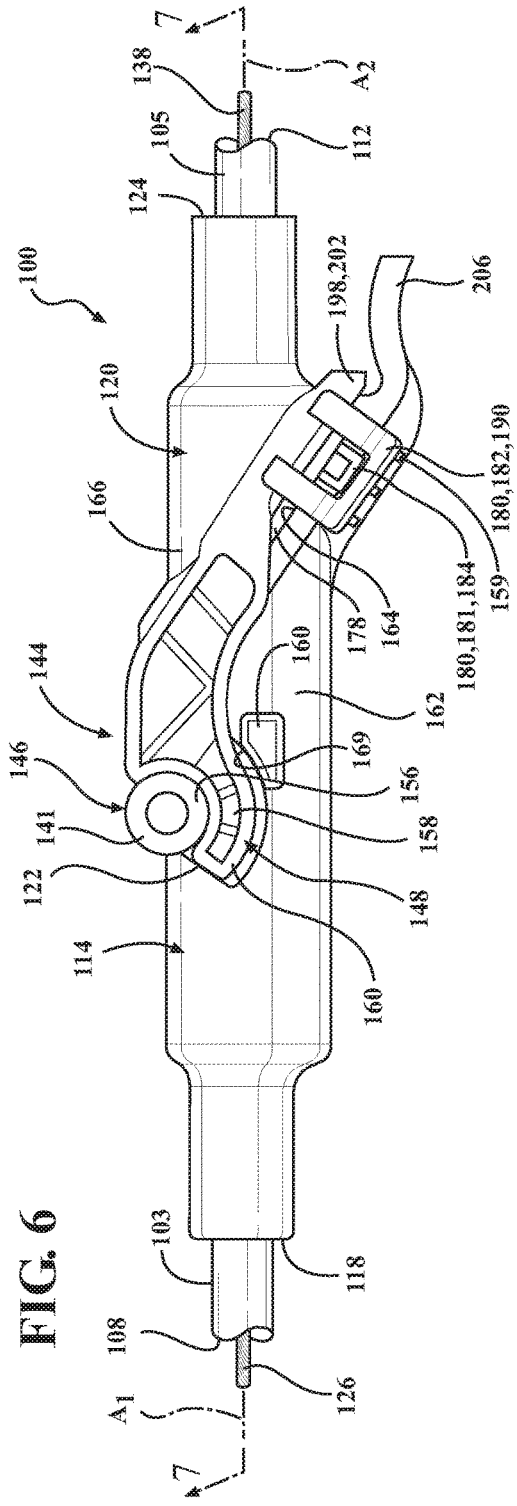
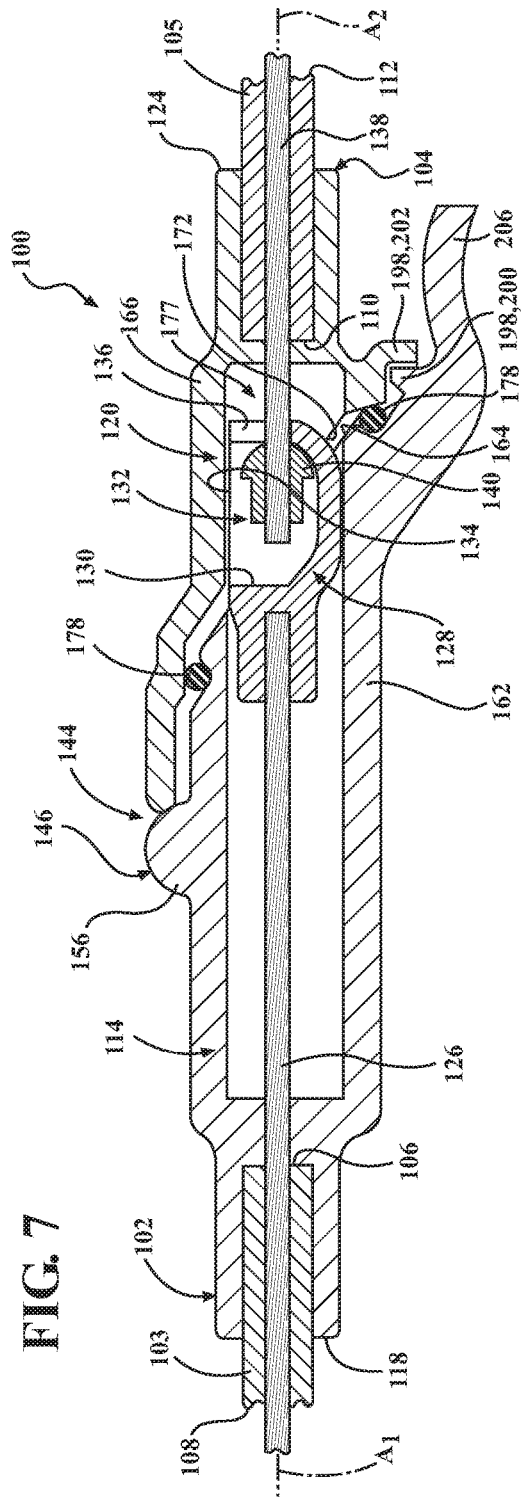

MOTION TRANSMITTING AND METHOD OF ASSEMBLING A REMOTE CONTROL ASSEMBLY HAVING A GUIDE MECHANISM

The subject patent application claims priority to and all the benefits of International Patent Application No. PCT/US2013/070761, filed on Nov. 19, 2013, the disclosure of which is incorporated herein by reference in its entirety.

FIELD OF THE DISCLOSURE

The present disclosure relates generally to cable assemblies, and more particularly, to a motion transmitting remote control assembly having a guide mechanism.

BACKGROUND

Motion transmitting remote control assemblies are typically used to transmit motion along a path. These assemblies may be found in vehicle shifters, latch release systems, pedal assemblies, adjustable vehicle seats, and other similar automotive applications. In certain applications, it may be necessary for the control assembly to be formed of two pieces that are later joined. A two-piece control assembly typically includes a pair of conduit sections, each moveably supporting a flexible core element such as a cable. Each conduit section may have an end fitting, and the core elements are interconnected when the end fittings are secured to one another. In some instances, it may be difficult to properly align and secure the end fittings to suitably interconnect the core elements.

SUMMARY

The subject invention includes a motion transmitting remote control assembly having first and second conduit sections. The first conduit section has a first end fitting, which has first and second ends and extends along a first longitudinal axis. The second conduit section has a second end fitting, which has first and second ends and extends along a second longitudinal axis. The second end fitting has an open position where the second longitudinal axis is transverse to the first longitudinal axis and a closed position where the second longitudinal axis aligns with the first longitudinal axis. The assembly further comprises a first core element moveably support by the first conduit section and partially disposed within the first end fitting, a first coupler mounted to the first element adjacent the first end fitting, a second core element moveably supported by the second conduit section and partially disposed within the second end fitting, and a second coupler mounted to the second core element adjacent the second end fitting. The second coupler is spaced from the first coupler when the second end fitting is in the open position, and the second coupler engages the first coupler when the second end fitting is in the closed position. The assembly further comprises a guide mechanism having a first portion coupled to the first end fitting and a second portion coupled to the second end fitting. The guide mechanism aligns the first and second end fittings when the second end fitting is in the open position, and guides the second end fitting toward the first end fitting until the second end fitting is in the closed position to thereby interconnect the first and second core elements and secure the second conduit section to the first conduit section.

Accordingly, the subject invention provides a control assembly having separate conduit sections with a guide mechanism to efficiently align, guide, and secure the conduit sections together.

BRIEF DESCRIPTION OF THE DRAWINGS

Advantages of the present disclosure will be readily appreciated as the same becomes better understood by reference to the following detailed description when considered in connection with the accompanying drawings.

FIG. 6 is a side view of the motion transmitting remote control assembly in a closed position.

FIG. 7 is a cross-sectional view of the motion transmitting remote control assembly of FIG. 6 taken along line 7-7.

DETAILED DESCRIPTION

Figure 1:
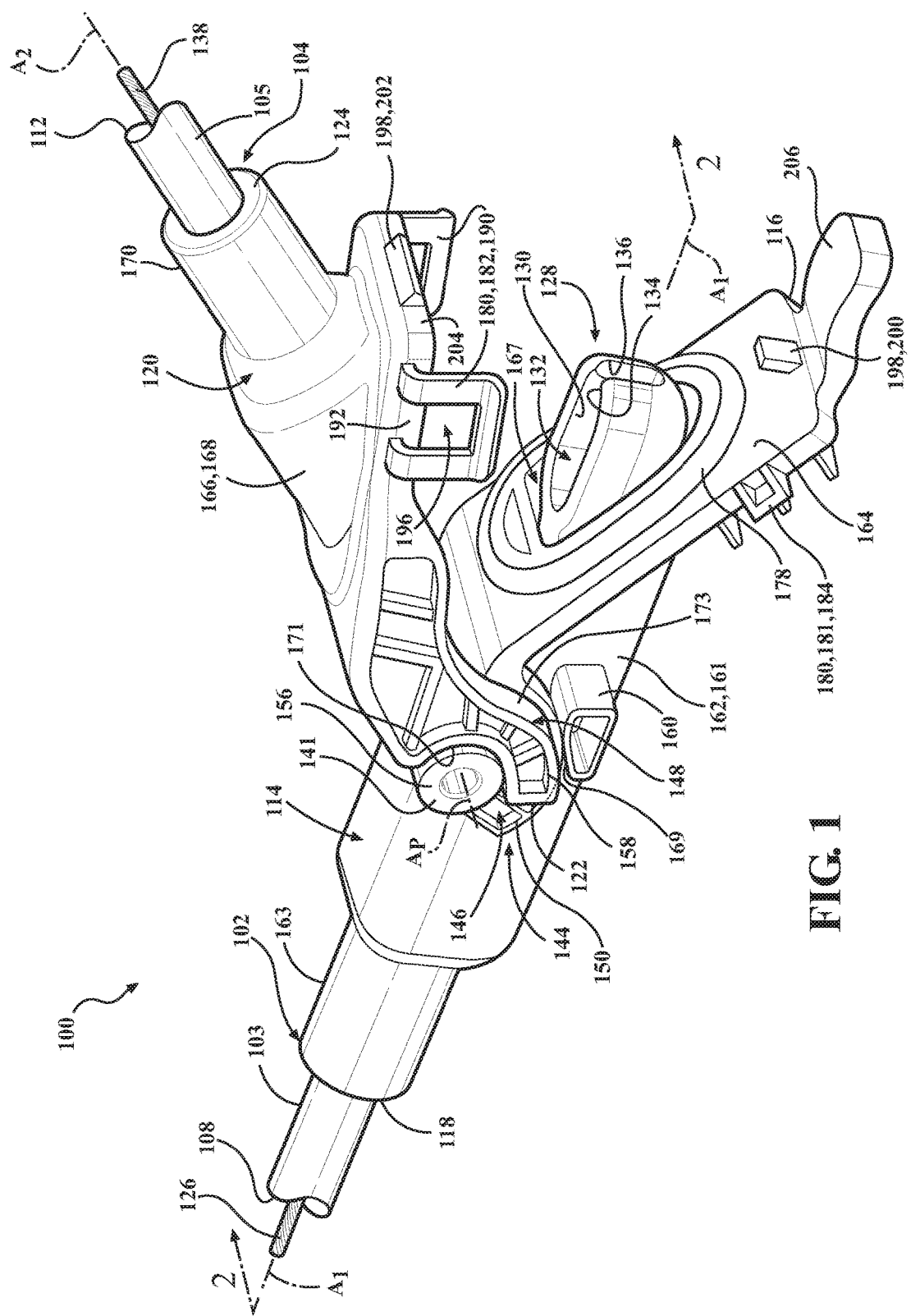
FIG. 1 is a perspective view of a motion transmitting remote control assembly of the present invention in an open position.

Referring now to the Figures, wherein like numerals indicates like or corresponding parts throughout the several views, a motion transmitting remote control assembly 100 is shown and described. With reference to FIGS. 1-8, the motion transmitting remote control assembly 100 has first 102 and second 104 conduit sections. The first 102 and second 104 conduit sections are generally designed to house or otherwise support first 126 and second 138 core elements, respectively. The first 102 and second 104 conduit sections may comprise an inner tubular liner of an organic polymeric material surrounded by helically wound lay wires, where the inner tubular liner is encased with a tubular casing of extruded organic polymeric material. It is to be understood that the first 102 and second 104 conduit sections may alternatively comprise other known materials and/or configurations.

The first conduit section 102 extends along a first longitudinal axis $A_1$. The first conduit section 102 comprises a first conduit 103 that has inward and outward ends. The inward end of the first conduit 103 is identified by reference numeral 106 in the figures, and the outward end extends in a direction opposite from the inward end 106. The first conduit 103 is shown in the figures as being fragmented as the first conduit 103 extends outwardly from the inward end 106, and the point at which the first conduit 103 is fragmented is identified by reference numeral 108. Furthermore, the second conduit section 104 extends along a second longitudinal axis $A_2$. The second conduit section 104 has a second conduit 105 that also comprises inward and outward ends. The inward end of the second conduit 105 is identified by reference numeral 110 in the figures, and the outward end extends in a direction opposite from the inward end 110. The second conduit 105 is also shown in the figures as being fragmented as the second conduit 105 extends outwardly from the inward end 110, and the point at which the second conduit 105 is fragmented is identified by reference numeral 112.

A first end fitting 114 is disposed about the inward end 106 of the first conduit 103. The first end fitting 114 comprises first 116 and second 118 ends. Furthermore, a second end fitting 120 is disposed about the inward end 110 of the second conduit 105. The second end fitting 120 also comprises first 122 and second 124 ends.

The first core element 126 is moveably supported by the first conduit section 102, and is partially disposed within the first end fitting 114. A first coupler 128 is mounted to the first core element 126 adjacent the first end fitting 114. The first coupler 128 comprises at least one wall 130 defining a pocket 132 having an opening 134. The pocket 132 has, for instance, a diameter, length, width, depth, and/or any other dimension so that the pocket 132 will suitably receive a second coupler 140 of the second end fitting 120 when in a closed position. Details of the second end fitting 120 and the closed position are set forth below. The first coupler 128 also comprises a slot 136 defined in the at least one wall 130 adjacent to the opening 134 of the pocket 132. As shown at least in FIGS. 1 and 2, the slot 136 generally aligns with a portion of the first longitudinal axis $A_1$, and is configured to receive the second core element 138 when the second end fitting 120 is in the closed position. It is to be understood that the first coupler 128 may have any other configuration and/or design so long as the pocket 132 of the first coupler 128 suitably receives the second coupler 140, and the first 102 and second 104 conduit sections can properly align when the second end fitting 120 is in the closed position.

The second core element 138 is moveably supported by the second conduit section 104, and is partially disposed within the second end fitting 120. The second coupler 140 is mounted to the second core element 138 adjacent the second end fitting 120. As shown, the second coupler 140 is a ferrule. Alternatively, the second coupler 140 may be a ring, cap, sleeve, or the like. As previously mentioned, the second coupler 140 is configured to be received within the pocket 132 of the first coupler 128 when the second end fitting 120 is in the closed position.

The first 126 and second 138 core elements are flexible wires, or are filaments that are woven together and are flexible. As shown, the first 126 and second 130 core elements are cables.

Figure 3:
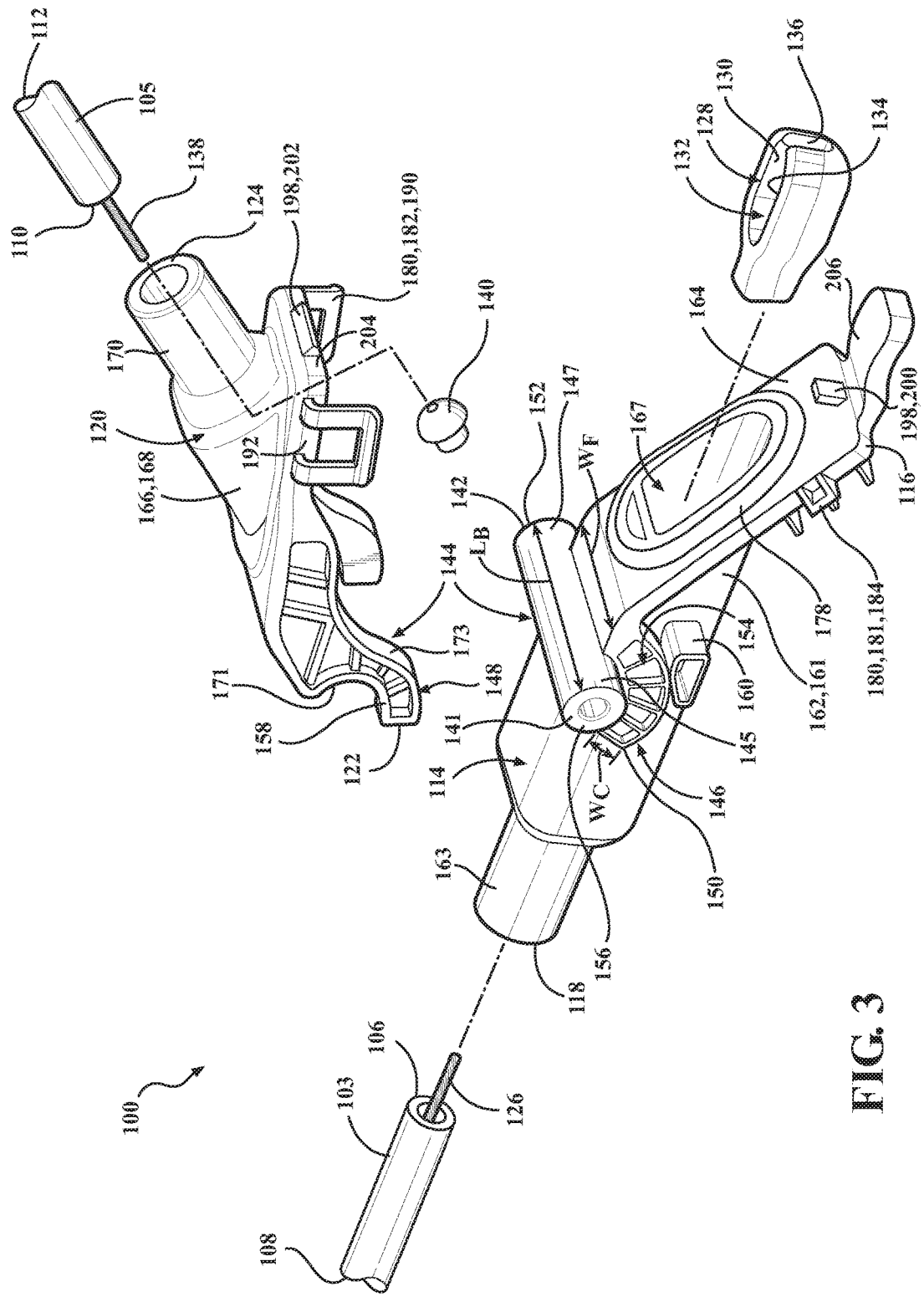
FIG. 3 is an exploded, perspective view of the motion transmitting remote control assembly of FIG. 1.

The motion transmitting remote control assembly 100 further comprises a guide mechanism 144, which guides the second end fitting 120 between the open and closed positions. The guide mechanism 144 has a first portion 146 that is coupled to the first end fitting 114 and a second portion 148 that is coupled to the second end fitting 120. As best shown in FIG. 3, the guide mechanism 144 also has opposing sides 150, 152. A pivot axis $A_p$ is defined between the sides 150, 152. As shown, the sides 150, 152 are substantially parallel to the first longitudinal axis $A_1$, and the pivot axis $A_p$ is transverse to the first longitudinal axis $A_1$.

The first portion 146 of the guide mechanism 144 comprises a fixed channel 154. Although not shown, the first portion 146 could comprise a single fixed channel 154 located at one of the sides 150, 152 of the guide mechanism 144. As shown, the first portion 146 comprises a fixed channel 154 on each of the sides 150, 152 of the guide mechanism 144. The fixed channel 154 is crescent-shaped and has a width $W_c$. It is to be understood that the fixed channel 154 may have any desirable configuration and/or shape so long as the second portion 148 of the guide mechanism 144 can suitably couple with the first portion 146. Further, the fixed channel 154 is formed on the first end fitting 114. The fixed channel 154 may otherwise be defined in the first end fitting 114.

As shown, the first portion 146 of the guide mechanism 144 comprises the channel 154, a boss 156, and a carriage 160. The fixed channel 154 is defined between the boss 156 and the carriage 160. The boss 156 is a generally cylindrical body that terminates at two ends 141, 142, and has a length $L_B$. As shown, the length $L_B$ of the boss 156 is longer than the width $W_F$ of the first end fitting 114 so that the ends 141, 142 protrude from the sides of the first end fitting 114. The protruding ends 141, 142 of the boss 156 form surfaces 145, 147. The surface 145 defines part of the channel 154 on the side 150 of the guide mechanism 144, and the surface 147 defines part of the channel 154 on the side 152 of the guide mechanism 144. Additionally, the boss 156 is situated in the assembly 100 so that the boss 156 is substantially perpendicular to the first core element 126 and substantially perpendicular to a portion the first longitudinal axis $A_1$.

The carriage 160 is a body formed or disposed on the first end fitting 114. As shown, the carriage 160 is located at each side 150, 152 of the guide mechanism 144. Further, the carriage 160 has a surface 169 that defines another part of the channel 154 on both sides 150, 152 of the guide mechanism 144.

The second portion 148 of the guide mechanism 144 comprises an arm 158 configured to move within the fixed channel 154 of the first portion 146. Although not shown, the second portion 148 could comprise a single arm 158 disposed on one of the sides 150, 152 of the guide mechanism 144. The arm 158 is disposed on the same side 150, 152 as the single fixed channel 154. Further, the arm 158 is aligned and at least partially received in the single fixed channel 154. As shown, the second portion 148 comprises a pair of arms 158, one disposed on each side 150, 152 of the guide mechanism 144. Each arm 158 is aligned and at least partially received in a respective one of the fixed channels 154.

The arm(s) 158 generally extend outwardly from the second end fitting 120 so that the arm(s) 158 can be easily received in the channel(s) 154. The arm(s) 158 has a configuration that is complementary to the configuration of the channel(s) 154. The arm(s) 158 may have any configuration and/or shape (e.g. a crescent shape as shown in the figures) which is complementary to the configuration and/or shape of the channel(s) 154 (e.g. a crescent shape as also shown in the figures). In this way, the arm(s) 158 can readily move (e.g. slide) into the channel(s) 154 when the first 114 and second 120 end fittings are coupled. As shown, the arm(s) 158 has first 171 and second 173 surfaces, where the first surface 171 is has an arcuate or bowed shape, and the surface 171 conforms to the shape of the surface 145, 147 of the boss 156. The configuration of the first surface 171 in combination with the configuration of the surface 145, 147 of the boss 156 enables the arm 158 to readily move through the channel 154 as the second end fitting 120 pivots about the pivot axis $A_p$. In an example, the first surface 171 of the arm(s) 158 slides on the surface 145, 147 about the pivot axis $A_p$ when the second end fitting 120 moves toward the closed position. Furthermore, the carriage 160 is utilized as an initial alignment and/or guide surface to allow the first surface 171 and the surface 145, 147 to come together properly. Accordingly, there is typically no intended contact between carriage 160 and the arm(s) 158 during movement of the second end fitting 120.

The second surface 173 of the arm 158 also has an arcuate or bowed shape that enables the arm 158 to readily move through the channel 154 upon initially contacting the surface 169 of the carriage 160. Accordingly, the complementary configurations of the arms(s) 158 (including the surfaces 171, 173) and the channel(s) 154 (defined at least by the surfaces 145, 147 of the boss and the surface 169 of the carriage 160) enable the arm(s) 158 to readily move so that the second end fitting 120 can readily move about the pivot axis $A_p$ when the arm(s) 158 is at least partially disposed within the channel(s) 154.

Figure 4:
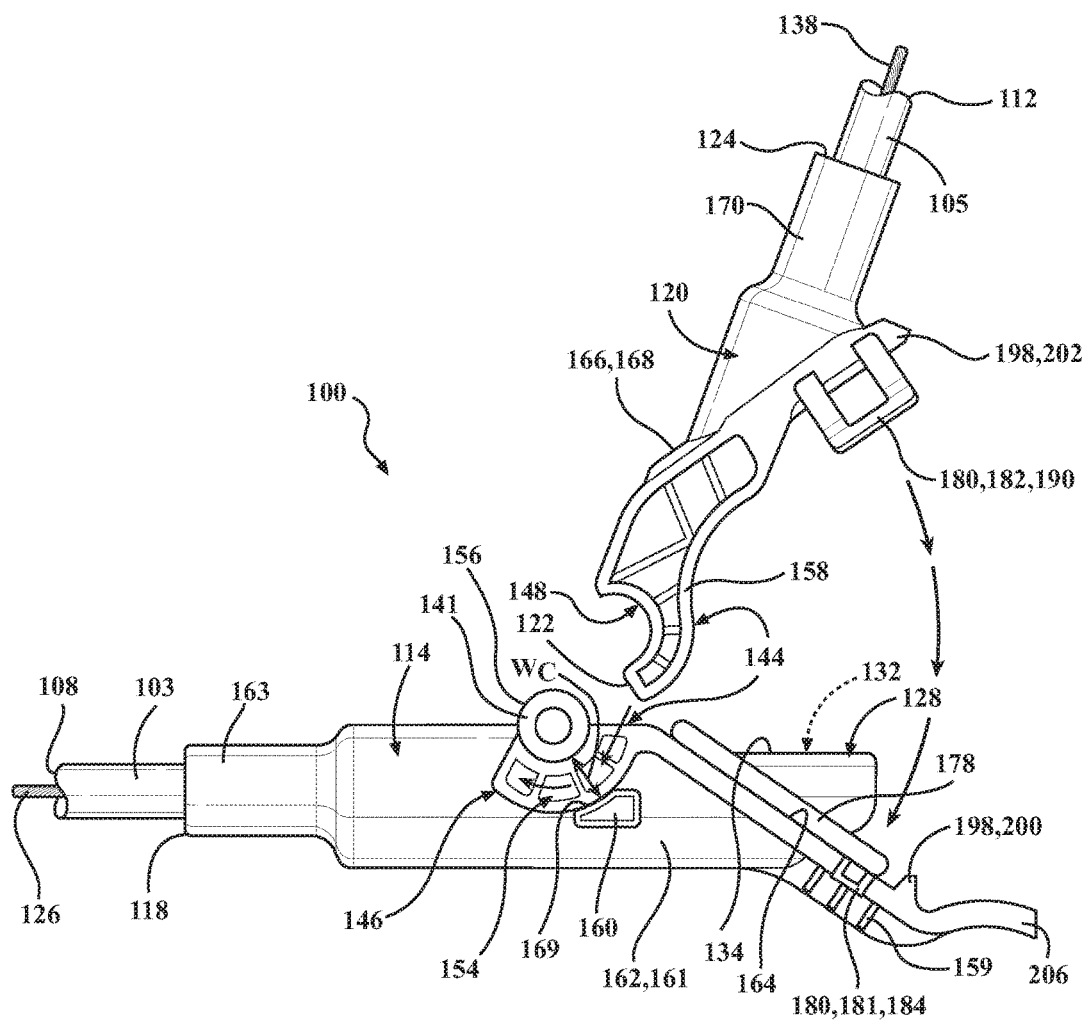
FIG. 4 is a side view of the motion transmitting remote control assembly with a second end fitting spaced from the first end fitting.
Figure 5:
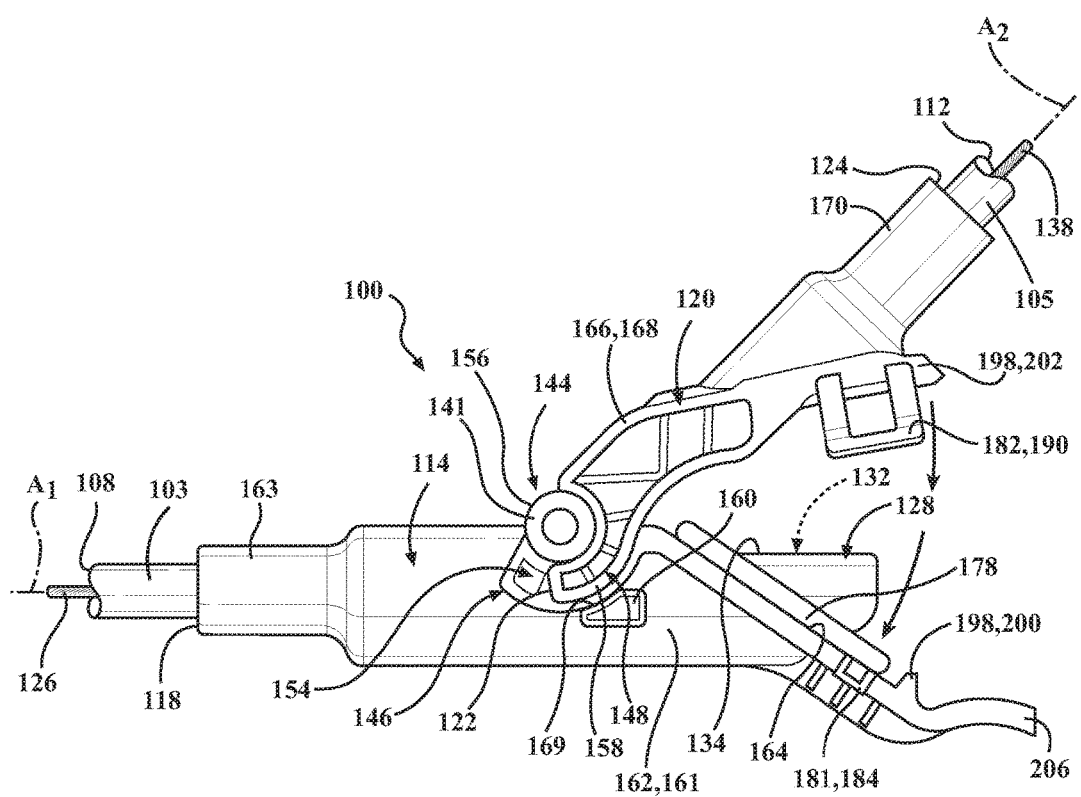
FIG. 5 is a side view of the motion transmitting remote control assembly in the open position.

The first end fitting 114 further includes a first body 162 having a head portion 161 and a neck portion 163, where the head portion 161 includes and/or supports the first portion 146 of the guide mechanism 144. The head portion 161 further includes a plurality of ribs 159. While three ribs 159 are shown in FIGS. 4-6, the head portion 161 may comprises less or more than three ribs (such as one, two, four, five, or more than five ribs 159).

The neck portion 163 includes and/or supports first conduit 103. A coupling surface 164 is attached to the first body 162, and is angularly offset from the first body 162. The coupling surface 164 may be angled from about 30 to 50 degrees from the first body 162. The first coupling surface 164 is also generally flat and/or smooth in configuration. It is to be understood, however, that the first coupling surface 164 may have any desirable configuration, such as an uneven configuration or a textured configuration.

Figure 2:
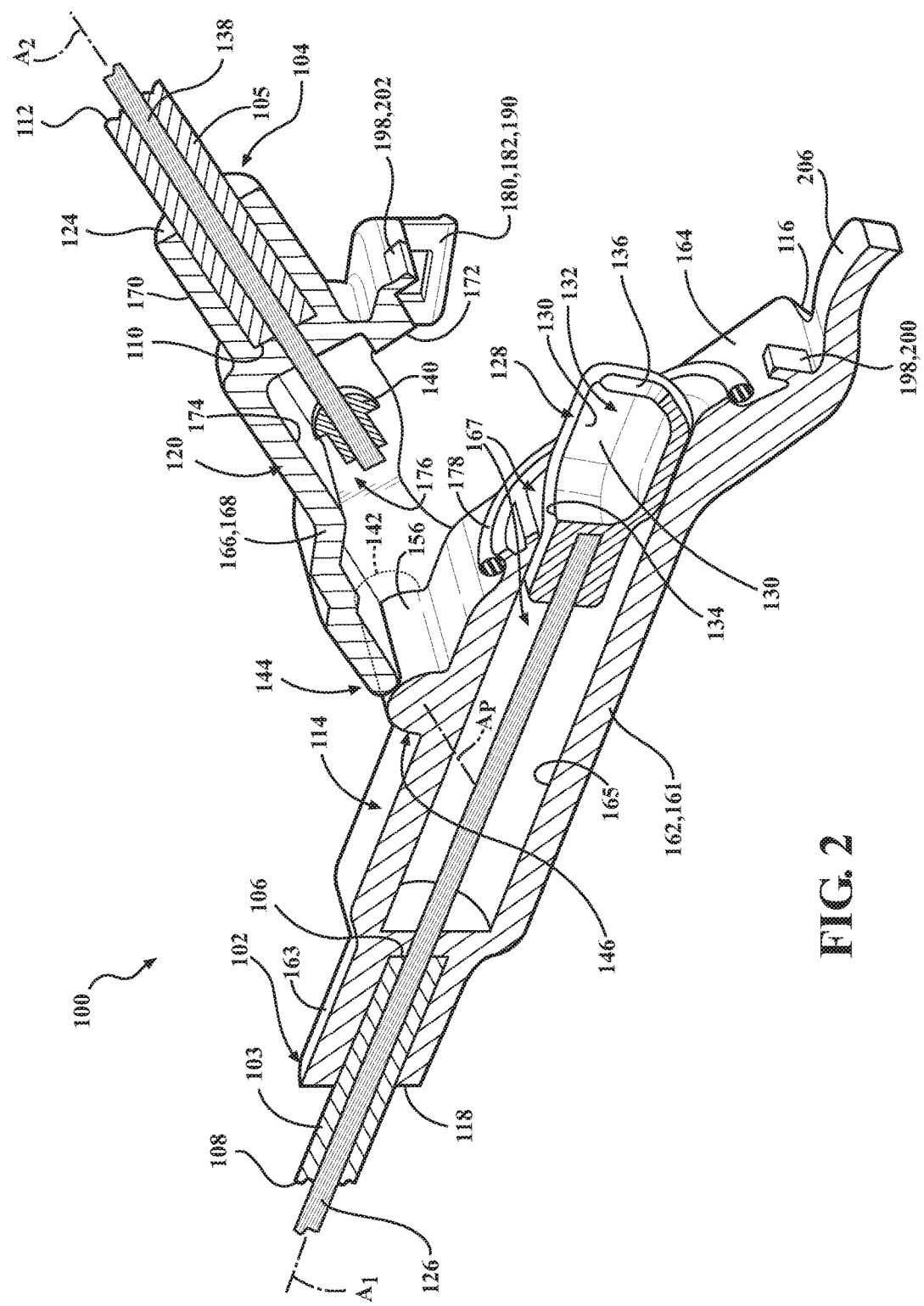
FIG. 2 is a cross-sectional view of the motion transmitting remote control assembly of FIG. 1 taken along line 2-2.

As is best shown in FIGS. 1-3, the first end fitting 114 includes at least one wall 165 that defines a first open cavity 167. While the second end fitting 120 is in the open position, the first core element 126 and the first coupler 128 are partially disposed in the first open cavity 167. A portion of the first coupler 128 also protrudes from the first coupling surface 164 such that at least the opening 134 of the pocket 132 and the slot 136 defined in the first coupler 128 are exposed.

The second end fitting 120 further includes a second body 166 having a head portion 168 and a neck portion 170, where the head portion 168 includes and/or supports the second portion 148 of the guide mechanism 144. The neck portion 170 includes and/or supports the second conduit 105. A second coupling surface 172 is attached to the second body 166, and is angularly offset from the second body 166. The second coupling surface 172 aligns with the first coupling surface 164 when the second end fitting 120 is in the closed position.

The second end fitting 120 further includes at least one wall 174 that defines a second open cavity 176. While the second end fitting 120 is in the open position, the second core element 138 and the second coupler 140 are partially disposed in the second open cavity 176.

As previously mentioned, the guide mechanism 144 guides the second end fitting 120 between open and closed positions. The open position includes any position of the second end fitting 120 relative to the first end fitting 114 where the second coupler 140 is spaced from the first coupler 128. The open position includes a fully open position (which is depicted in FIGS. 1, 2, and 5) and any position between the fully open position and the closed position (not shown). In the open position, the second longitudinal axis $A_2$ is transverse to the first longitudinal axis $A_1$. The closed position of the second end fitting 120 relative to the first end fitting 114 is where the second coupling surface 172 aligns with the first coupling surface 164 and a portion of the second longitudinal axis $A_2$ aligns with a portion of the first longitudinal axis $A_1$. When in the closed position, the first open cavity 167 combines with the second open cavity 176 to form a closed cavity 177 (shown in FIG. 7) within which the first 128 and second 140 couplers are disposed. Said differently, the first open cavity 167 mates with the second open cavity 176 to form the closed cavity 177. It is to be understood that, in use, the first 126 and second 138 core elements are free to move linearly at least within the closed cavity 177.

Since the second portion 148 of the guide mechanism 144 is coupled to the first portion 146 about the sides 150, 152, the second end fitting 120 can pivot about the pivot axis $A_p$ between the open and closed positions.

Figure 8:
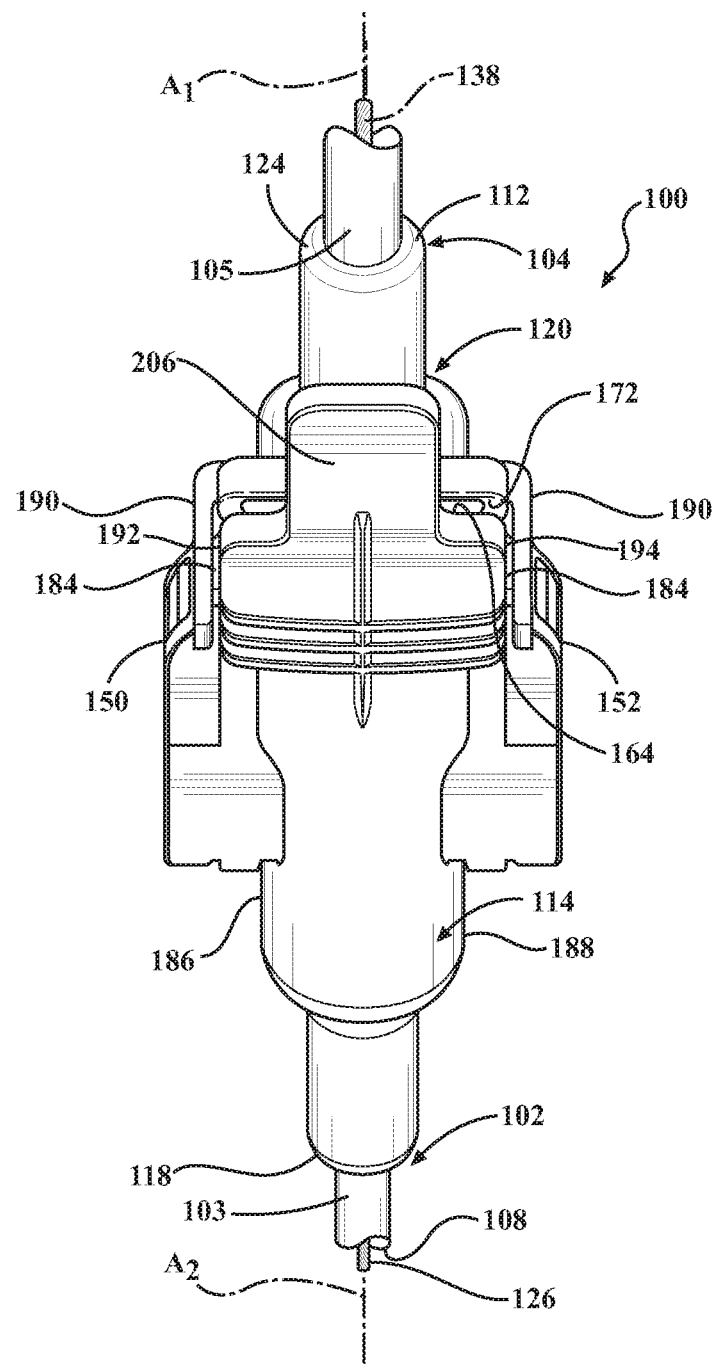
FIG. 8 is an end view of the motion transmitting remote control assembly.

It is to be understood that the guide mechanism 144 is designed to align the first 114 and second 120 end fittings as the end fittings 114, 120 are coupled to position the second end fitting 120 in the open position. The guide mechanism 144 is also designed to guide the second end fitting 120 toward the first end fitting 114 when the second end fitting 120 pivots about the pivot axis $A_p$ until the second end fitting 120 is in the closed position. It is also to be understood that guiding the end fitting 120 toward the first end fitting 114 is accomplished, by the guide mechanism 144, while maintaining alignment of the first 114 and second 120 end fittings. Alignment of the first 114 and second 120 end fittings is maintained while the second end fitting 120 moves about the pivot axis $A_p$ so that the second end fitting 120 straddles the first end fitting 114 when the second end fitting 120 is in the closed position, as shown in FIG. 8.

A seal 178 can be coupled to at least one of the first 164 and second 172 coupling surfaces. As shown, the seal 178 is coupled to the first coupling surface 164. The seal 178 is generally sandwiched between the first coupling surface 164 and the second coupling surface 172 when the coupling surfaces 164, 172 are aligned, which occurs when the second end fitting 120 is in the closed position. It is to be understood that the first 164 and second 172 coupling surfaces are spaced from one another when the seal 178 is sandwiched between the surfaces 164, 172. Said differently, the first 164 and second 172 coupling surfaces do not contact one another when the seal 178 is sandwiched between the surfaces 164, 172. Furthermore, the first 164 and second 172 coupling surfaces trap the seal 178 between the surfaces 164, 172 and seal the closed cavity 177 from outside elements. As shown, the seal 178 is an o-ring seal formed from a suitably flexible polymeric material, such as rubber. It is to be understood that any seal 178 may be used so long as the seal 178 seals the closed cavity 177 formed by the combination of the first 167 and second 176 cavities when the second end fitting 120 is in the closed position. Ideally, the seal 178 will seal the closed cavity 177 from the outside elements, such as moisture and/or various elements (such as contaminants) present in the atmosphere or environment. The presence of moisture and/or elements may, in some instances, adversely affect the performance of the motion transmitting remote control assembly 100. In an example, a particularly good seal of the closed cavity 177 may be achieved because of the guided movement of the second end fitting 120 toward the first end fitting 114.

The motion transmitting remote control assembly 100 may further include a retaining mechanism 180, which is designed to retain the second end fitting 120 in the closed position. The retaining mechanism 180 comprises a first latch component 181 mounted to the first end fitting 114 and a second latch component 182 mounted to the second end fitting 120. It is to be understood that the first latch component 181 may otherwise be mounted to the second end fitting 120 and the second latch component 182 may otherwise be mounted to the first end fitting 114.

The first latch component 181 can include a tab 184 formed on, and protruding outwardly from opposing sides 186, 188 of the first end fitting 114. The second latch component 182 can include a flange 190 formed on opposing sides 192, 194 of the second end fitting 120. The flanges 190 generally extending away from the second end fitting 120 in a general direction toward the first end fitting 114.

The flanges 190 each comprise an aperture 196 designed to capture the respective tab 184 when the second end fitting 120 is placed into the closed position. More specifically, the flange 190 on each side 192, 194 of the second end fitting 120 bends slightly outwardly over the tab 184 formed on each side 186, 188 of the first end fitting 114, and the tab 184 then snaps into the aperture 196.

The motion transmitting remote control assembly 100 can also comprise an alignment feature 198, which includes a tab 200 disposed on the first coupling surface 164 and generally extending in a direction toward the second end fitting 120. The alignment feature 198 further includes a cover 202 disposed on an end 204 of the second body 166 of the second end fitting 120. The cover 202 is designed to capture or otherwise envelope the tab 200 extending from the first coupling surface 164 when the second end fitting 120 is in the closed position. When the cover 202 captures the tab 200 as the second end fitting 120 is moved from the open position to the closed position, the second end fitting 120 is properly aligned with the first end fitting 114 so that the first 126 and second 138 core elements are properly interconnected.

The motion transmitting remote control assembly 100 can also comprise a projection 206 disposed at the end 116 of the first end fitting 114. The projection 206 is designed to be gripped by a user of the assembly 100 to hold the first end fitting 114 in position as the second end fitting 120 is moved into the closed position, or to hold the first end fitting 114 in position so that the second end fitting 120 can be moved from the closed position into the open position.

Also disclosed herein are methods for assembling the motion transmitting remote control assembly 100. One method is described below with reference to FIGS. 4-8. This method comprises engaging the first portion 146 of the first end fitting 114 and the second portion 148 of the second end fitting 120, and aligning the first 114 and second 120 end fittings with the second end fitting 120 in the open position. It is to be understood that the engaging and the aligning step may occur simultaneously. Additionally, when the first 114 and second 120 end fittings are aligned, the first 128 and second 140 couplers automatically align. This is desirable so that that the second coupler 140 can be easily received in the pocket 132 of the first coupler 128 when the second end fitting 120 is in the closed position.

The present method of assembling the motion transmitting remote control assembly 100 further includes guiding the second end fitting 120 toward the first end fitting 114 by moving the first 146 and second 148 portions relative to each other until the second end fitting 120 is in the closed position. As previously mentioned, when the second end fitting 120 is in the closed position, a portion of the second longitudinal axis $A_2$ aligns with a portion of the first longitudinal axis $A_1$. The guiding of the first 114 and second 120 end fittings is due, at least in part, to the combination of the channel(s) 154 and the arm(s) 158. More specifically, when the arm(s) 158 are engaged with the channel(s) 154, the arm(s) 158 move in a direction following the path of the channel(s) 154 which restricts movement of the second end fitting 120 to pivotal or rotational movement about the pivot axis $A_p$. Said differently, with the arm(s) 158 following the path of the channel(s) 154, the second end fitting 120 cannot move laterally (such as side-to-side) with respect to the first end fitting 114 and/or cannot tilt to one side or the other. It is to be understood, however, that there may be some tolerance between the arm(s) 158 and the carriage 160 so that the arms(s) 158 can readily move through the channel(s) 154. By the restricted movement of the arm(s) 158, the second end fitting 120 is guided toward the first end fitting 114 as shown by the arrows set forth in FIG. 5. The guiding may be accomplished by pivoting the second end fitting 120 about the pivot axis $A_p$ so that the second coupling surface 172 moves toward the first coupling surface 164 and the second end fitting 120 moves toward the closed position. Pivoting of the second end fitting 120 is accomplished by moving the arm(s) 158 through the channel(s) 154. Furthermore, the guided movement of the second end fitting 120 enables the second end fitting 120 to straddle the first end fitting 114 when the second end fitting 120 is in the closed position (as shown in FIGS. 6-8).

It is to be understood that the second coupler 140 also engages the first coupler 128 to interconnect the first 126 and second 138 core elements during the guiding of the second end fitting 120 into the closed position. Engagement of the first 128 and second 140 couplers generally occurs simultaneously with the guiding. It is further to be understood that when the first 126 and second 138 core elements are interconnected, the first 126 and second 138 core elements can move linearly along the aligned portions of the first $A_1$ and second $A_2$ longitudinal axes.

When the second end fitting 120 is positioned in the closed position, the retaining mechanism 180 may be utilized to secure the first 114 and second 120 end fittings to one another, as previously described. It is to be understood that the second end fitting 120 can also be moved from the closed position to the open position. This may be accomplished by releasing the retaining mechanism 180 so that the second end fitting 120 is unsecured from the first end fitting 114 and is allowed to pivot about the pivot axis $A_p$ into the open position. Unsecuring the second end fitting 120 from the first end fitting 114 may be accomplished by flexing the flanges 190 formed on the second body 166 of the second end fitting 120 outwardly so as to release the tabs 184 formed on the first body 162 of the first end fitting 114. After the tabs 184 have been released, the second end fitting 120 is free to move back into the fully open position.

Another method of assembling the motion transmitting remote control assembly 100 comprises the steps of engaging the first portion 146 of the first end fitting 114 and the second portion 148 of the second end fitting 120, and guiding the second end fitting 120 toward the first end fitting 114 by moving the first 146 and second 148 portions relative to each other until the second end fitting 120 is in the closed position. The method further includes the step of mating the first open cavity 167 with the second open cavity 176 to form the closed cavity 177 when the second end fitting 120 is in the closed position. Furthermore, the second coupler 140 simultaneously engages with the first coupler 128 to interconnect the first 126 and second 138 core elements during the guiding step. The method further includes sandwiching the seal 178 between the first 164 and second 172 coupling surfaces when the second end fitting 120 is in the closed position to seal the closed cavity 177.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that the invention may be practiced otherwise than as specifically described.

What is claimed is:

1. A motion transmitting remote control assembly comprising:

a first conduit section having a first end fitting with said first end fitting having first and second ends and extending along a first longitudinal axis;

a second conduit section having a second end fitting with said second end fitting having first and second ends and extending along a second longitudinal axis with said second end fitting having an open position where said second longitudinal axis is transverse to said first longitudinal axis, and a closed position where a portion of said second longitudinal axis aligns a portion of said first longitudinal axis;

a first core element moveably supported by said first conduit section and partially disposed within said first end fitting;

a first coupler mounted to said first core element adjacent said first end fitting;

a second core element moveably supported by said second conduit section and partially disposed within said second end fitting;

a second coupler mounted to said second core element adjacent said second end fitting with said second coupler being completely spaced from said first coupler when said second end fitting is in said open position and said second coupler engaging said first coupler when said second end fitting is in said closed position; and a guide mechanism having a first portion coupled to said first end fitting and a second portion coupled to said second end fitting with said first and second portions of said guide mechanism engaging one another to align said first and second end fittings when said second end fitting is in said open position with said first and second couplers remaining completely spaced from one another as said first and second portions engage one another, said second portion moving relative to said first portion as said second end fitting moves between said open and closed positions, and said first and second portions of said guide mechanism guiding said second end fitting toward said first end fitting until said second end fitting is in said closed position to thereby interconnect said first and second core elements and secure said second conduit section to said first conduit section, wherein said first portion comprises a fixed channel and said second portion comprises an arm moving within said channel during said movement of said second end fitting between said open and closed positions.

2. The assembly as set forth in claim 1 wherein said first portion of said guide mechanism has opposing sides with a pivot axis defined between said sides, and said second portion of said guide mechanism is coupled to said first portion about said sides to enable said second end fitting to pivot about said pivot axis between said open and closed positions.

3. The assembly as set forth in claim 2 wherein said second end fitting straddles said first end fitting when said second end fitting pivots about said pivot axis into said closed position.

4. The assembly as set forth in claim 2 wherein said opposing sides are substantially parallel to said first longitudinal axis, and said pivot axis is transverse to said first longitudinal axis.

5. The assembly as set forth in claim 1 wherein said first portion includes said fixed channel on each of said sides and said arm is further defined as a pair of arms with each of said pair of arms aligned and at least partially received in a respective one of said fixed channels.

6. The assembly as set forth in claim 1 wherein said first portion further comprises a boss and a carriage with said channel being defined between said boss and said carriage.

7. The assembly as set forth in claim 1 wherein said arm extends outwardly from said second end fitting.

8. The assembly as set forth in claim 1 wherein said arm has a configuration which is complementary to a configuration of said channel.

9. The assembly as set forth in claim 1 wherein said first portion defines a pivot axis transverse to said first longitudinal axis, and wherein said arm moves about said pivot axis when at least partially disposed within said channel.

10. The assembly as set forth in claim 1 wherein said first end fitting comprises a first body and a first coupling surface angularly offset from said first body and said second end fitting comprises a second body and a second coupling surface angularly offset from said second body with said first and second coupling surfaces aligning when said second end fitting is in said closed position.

11. The assembly as set forth in claim 10 further comprising a seal coupled to at least one of said first and second coupling surfaces with said seal being sandwiched between said first and second coupling surfaces when said second end fitting is in said closed position.

12. The assembly as set forth in claim 11 wherein said first and second coupling surfaces are spaced from one another when said seal is sandwiched between said first and second coupling surfaces.

13. The assembly as set forth in claim 10 further including a first latch component mounted to said first end fitting and a second latch component mounted to said second end fitting with said first and second latch components interlocking with each other to secure said second end fitting to said first end fitting when said second end fitting is in said closed position.

14. The assembly as set forth in claim 1 wherein said first coupler comprises a first pocket with said second coupler received in said first pocket when said second end fitting is in said closed position.

15. The assembly as set forth in claim 14 wherein said first pocket comprises a slot with a portion of said second core element received in said slot when said second coupler is received in said first pocket.

16. The assembly as set forth in claim 1 wherein said first end fitting comprises at least one wall defining a first open cavity with said first core element and said first coupler partially disposed in said first cavity when said second end fitting is in said open position.

17. The assembly as set forth in claim 16 wherein said second end fitting comprises at least one wall defining a second open cavity with said second core element and said second coupler partially disposed in said second cavity when said second end fitting is in said open position.

18. The assembly as set forth in claim 17 wherein said first and second cavities define a closed cavity when said second end fitting is in said closed position.

19. A method of assembling a motion transmitting remote control assembly having a first conduit section with a first end fitting extending along a first longitudinal axis and a second conduit section with a second end fitting extending along a second longitudinal axis, a first core element supported by the first conduit section and having a first coupler, a second core element supported by the second conduit section and having a second coupler, and a guide mechanism having a first portion coupled to the first end fitting and a second portion coupled to the second end fitting, said method comprising the steps of:

engaging the first portion of the guide mechanism with the second portion of the guide mechanism to align the first and second end fittings with the second end fitting being in an open position where the second longitudinal axis is transverse to the first longitudinal axis and the second coupler is completely spaced from the first coupler;

guiding the second end fitting toward the first end fitting by moving the first and second portions relative to each other until the second end fitting is in a closed position where the second longitudinal axis aligns with the first longitudinal axis; and simultaneously engaging the second coupler with the first coupler to interconnect the first and second core elements during the guiding of the first and second end fittings into the closed position, wherein said first portion includes a fixed channel and said second portion includes at least one arm, and wherein the step of pivoting the second end fitting relative to the first end fitting is further defined as moving the arm within the channel.

20. The method as set forth in claim 19 wherein the step of guiding the second end fitting toward the first end fitting is further defined as pivoting the second end fitting relative to the first end fitting toward the closed position about a pivot axis.

21. The method as set forth in claim 19 wherein said first coupler includes a first pocket, and wherein the step of engaging the second coupler with the first coupler is further defined as disposing the second coupler within the pocket of the first coupler.

22. The method as set forth in claim 19 further including the step of automatically aligning the first and second couplers during the step of engaging the first portion of the first end fitting with the second portion of the second end fitting to align the first and second end fittings.

23. A method of assembling a motion transmitting remote control assembly having a first conduit section with a first end fitting extending along a first longitudinal axis and a second conduit section with a second end fitting extending along a second longitudinal axis, said first conduit section having a first body and a first coupling surface angularly offset from the first body defining a first open cavity and the second conduit section having a second body with a second coupling surface angularly offset from said second body defining a second open cavity, a seal coupled to one of the first or second coupling surfaces, a first core element supported by the first conduit section and having a first coupler, a second core element supported by the second conduit section and having a second coupler, and a guide mechanism having a first portion coupled to the first end fitting and a second portion coupled to the second end fitting, said method comprising the steps of:

engaging the first portion of the first end fitting with the second portion of the second end fitting;

guiding the second end fitting toward the first end fitting by moving the first and second portions relative to each other until the second end fitting is in a closed position;

mating the first open cavity with the second open cavity to form a closed cavity when the second end fitting is in the closed position;

simultaneously engaging the second coupler with the first coupler to interconnect the first and second core elements during the guiding of the second end fitting into the closed position; and sandwiching the seal between said first and second coupling surfaces when the second end fitting is in the closed position to seal the closed cavity.

\* \* \* \* \*